United States Patent [19]

Onishi et al.

[11] Patent Number: 4,720,953
[45] Date of Patent: Jan. 26, 1988

[54] PARTITION WITH BUILT-IN FLOOR-CABLE RISER

[75] Inventors: Kiyoshi Onishi, Kanagawa; Toshikazu Enami, Ibaraki; Mobuo Masuoka, Tokyo, all of Japan

[73] Assignee: Thomas & Betts Corporation, Raritan, N.J.

[21] Appl. No.: 905,731

[22] Filed: Sep. 9, 1986

[30] Foreign Application Priority Data

Jan. 21, 1985 [JP] Japan .................................. 60-8900

[51] Int. Cl.⁴ ........................ E04F 17/08; E04H 1/00
[52] U.S. Cl. ..................................... 52/221; 174/48; 174/95; 439/215
[58] Field of Search ...................... 52/220, 221, 238.1, 52/239; 174/48, 95; 339/1 R, 2 R, 6 R, 22 R, 23, 21 R

[56] References Cited

U.S. PATENT DOCUMENTS

| | | |
|---|---|---|
| 2,132,400 | 10/1938 | Curren . |
| 2,162,545 | 6/1939 | Benander et al. . |
| 2,234,745 | 3/1941 | Von Rarrel . |
| 2,478,006 | 8/1949 | Paden . |
| 2,484,992 | 10/1949 | Ginther . |
| 2,579,854 | 12/1951 | Perkins . |
| 2,617,849 | 11/1952 | Wright et al. . |
| 2,669,632 | 2/1954 | Hammerly . |
| 2,680,775 | 6/1954 | Wiesmann . |
| 2,904,991 | 9/1959 | Vaughan et al. . |
| 2,939,101 | 5/1960 | Johnson . |
| 2,979,686 | 4/1961 | Longmire . |
| 3,012,217 | 12/1961 | Pantin . |
| 3,546,360 | 12/1970 | Bailey . |
| 3,708,607 | 1/1973 | Brode et al. . |
| 3,821,688 | 6/1974 | Larsile . |
| 4,037,900 | 7/1977 | Schmidger . |
| 4,135,775 | 1/1979 | Driscoll ............................ 52/221 X |
| 4,149,065 | 4/1979 | Goff et al. . |
| 4,166,195 | 8/1979 | Schwab . |
| 4,224,769 | 9/1980 | Ball et al. ............................ 52/221 X |
| 4,231,630 | 11/1980 | Propst et al. ...................... 52/221 X |
| 4,353,411 | 10/1982 | Harter et al. ...................... 52/221 X |
| 4,437,716 | 3/1984 | Cooper . |
| 4,494,808 | 1/1985 | Widell et al. . |
| 4,596,098 | 6/1986 | Finkbeiner et al. ............... 52/239 X |

FOREIGN PATENT DOCUMENTS

| | | | |
|---|---|---|---|
| 429111 | 7/1967 | Switzerland ........................... 52/221 |
| 2835952 | 3/1979 | Fed. Rep. of Germany ........ 52/221 |

OTHER PUBLICATIONS

Square D Co., Modular Medical Walls, Series 3000, 2000, and 1000, Product Brochure ©1979.
Thomas & Betts Corp., 4 p. Brochure, entitled, "Easy Transitions from Round Wire to Versa-Trak ® Undercarpet Wiring Systems, 1983.

Primary Examiner—Carl D. Friedman
Assistant Examiner—Richard E. Chilcot, Jr.
Attorney, Agent, or Firm—Robert M. Rodrick; Salvatore J. Abbruzzese

[57] ABSTRACT

An office wall partition is disclosed which has provisions for accommodating a floor-cable riser. The partition includes a gutter-shaped baseboard having an opening therein to admit the floor-cable riser. The partition is particularly useful with undercarpet cable.

11 Claims, 4 Drawing Figures

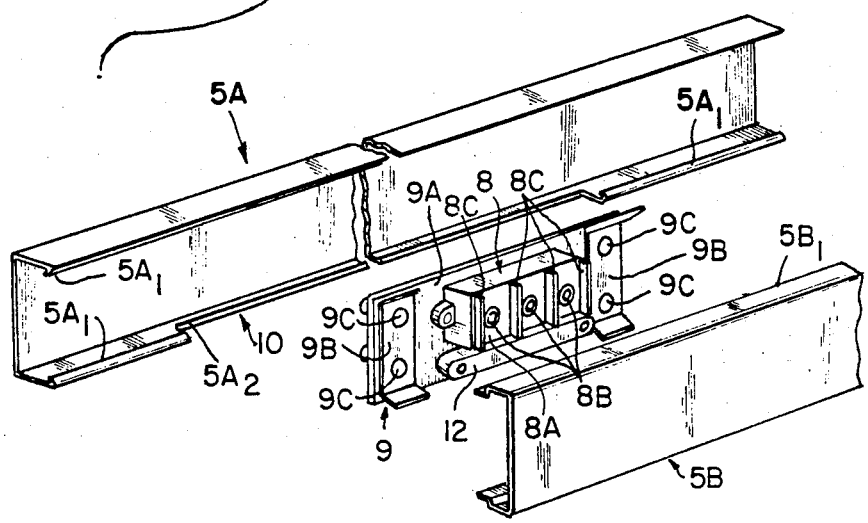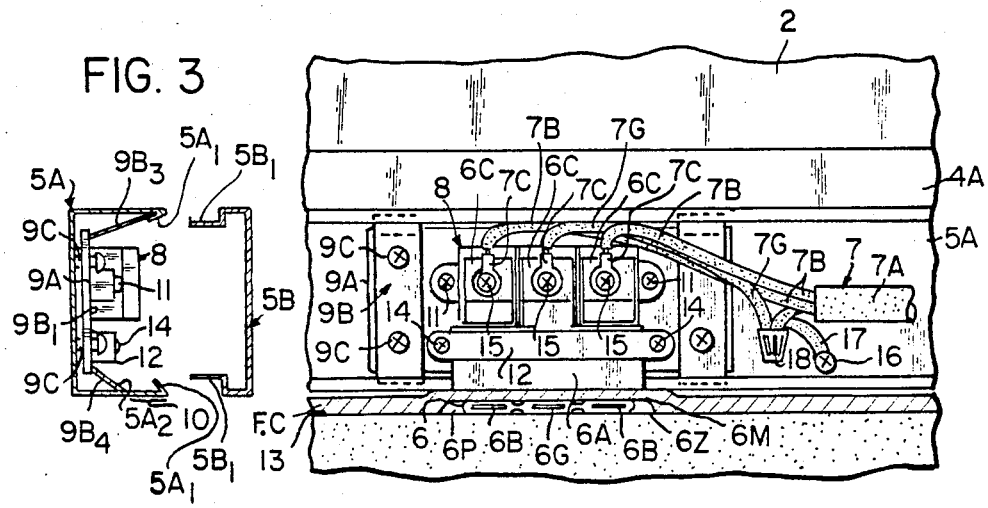

PARTITION WITH BUILT-IN FLOOR-CABLE RISER

FIELD OF INVENTION

This invention pertains to partitions provided to provides an interior layout and in particular pertains to a partition that, with respect to floor wiring, is suitable for accessing a floor-cable riser and connecting the cable to a cable wired inside the partition.

BACKGROUND OF THE INVENTION:

Such types of partition have been developed which are panelized, i.e., which are portable and can be arranged in any fashion to suit the layout. These are bing used more widely recently in conjunction with advances in office automation.

Conventionally, such partitions have, needless to say, been used in conjunction with changes in interior environments, and since compartmentalization is conducted in relation to such interior electrical equipment as copiers, word processors, intercoms, and lighting fixtures, they frequently incorporate electrical wiring components to provide electrical power and communications to such electrical equipment.

Meanwhile, in conjunction with increases in electrical equipment, as office automation progresses, floor wiring is being implemented in many and various ways with cables for providing power, supporting communications, and transmitting data. Under-carpet wiring systems are being developed to meet these needs.

These systems involve covering floor cables with carpeting, and are being more and more widely used as a solution to the problems that arise from traditional mole wiring, such as numerous bumps in the floor which trip those walking over it, and the adverse impact on interior aesthetics.

The floor cables of such under-carpet wiring must have risers that come through the carpet at desired locations for making necessary connections with respect to electrical equipment, connecting terminals and receptacles and the like which have been put in place, and it is not unusual for these to be connected even to cables wired inside partitions.

To date, systems have been proposed which use the wide spaces inside the panel attachment frames in connecting raised floor-cable terminals with cables wired inside the partitions.

In cases such as that noted above in which a cable wired inside a panel is connected to a raised terminal of a floor cable, inside a panel attachment frame, specially manufactured attachment frames and terminal boxes, etc., are specially employed to support the terminal plate that connects the two cables, and these are mounted to the panel frame with numerous screws, so that a complex structure ensures which is made up of many components that are basically unrelated to partitions, and these cases, moreover, require long floor-cable riser lengths and the making of many access holes in the baseboards and panel frames to admit the floor-cable risers.

The relationship between wiring positioning of floor cable and the installation positions of partitions is not necessarily always constant, and since it is necessary to fashion insertion holes for risers and incorporate terminal plates in conjunction with floor-cable wiring routes in such cases, the volume of work required for such fashioning and incorporation becomes great with the structure described above, and this work must be done on location, so further improvements are needed to enhance the ease of installation of this type of partition.

In the case noted above consideration is given to the idea of making the terminal plate freely movable relative to the panel attachment frame so that the connections with the cable wired inside the panel can be made quickly according to the discretionary wiring positioning of the floor cables, i.e. according to the riser locations, but this requires even more complex structures, with special rail structures being built into the panel attachment frame, or requiring rail-shaped framing, separately from the panel attachment frame, merely for the purpose of supporting the terminal-plate attachment plate.

SUMMARY OF THE INVENTION

In view of the problems with the prior art noted above, this invention to provide such a partition which has a simplified structure and which makes it easy to connect to risers of floor cable routed in any way desired.

The partition proposed in this invention is made such that it has an opening formed in a gutter-shaped baseboard main member provided at the bottom of a panel attachment frame. The opening admits a floor-cable riser, and an attachment fitting which is provided inside the said baseboard main member to attach the floor-cable riser.

The attachment fitting may be attached in a prescribed fixed position relative to the baseboard main member, but it is preferable that the following structure be adopted in order to make attachment to the said baseboard main member even easier.

That is, the attachment fitting should be structured with an attachment mount which directly attaches floor-cable risers, and a base member that supports the attachment mount and engages the baseboard main member.

The engagement of the base member with the baseboard main member can be brought about by providing the said base member with arm pieces that spread apart so as not to touch one another and are caused to engage with folded-back edges in the open side of the baseboard main member.

The base member that is made in the way noted above so as to be movable is provided with screws for fixing it in a prescribed position relative to the baseboard main member. These screws are screwed, from the open side of the baseboard main member, into the plate portion that forms the main member of the said base member, so as to press down on the bottom surface inside the baseboard main member, whereby the base member is pushed upward toward the open side of the baseboard main member, with the result that the arm pieces provided on the base member engage the folded-back edges of the baseboard main member so that the said base member is fixed in place.

In other words, the position of the base member on the baseboard is rendered adjustable by means of a screw-tightening operation.

The opening formed in the baseboard main member and corresponding to the base member may be formed on location by making cuts matching the riser locations, but it is desirable that such on-location work be eliminated, and that they be formed ahead of time at the time of the factory production.

In view of this desire, it is preferable that an opening be formed in the baseboard main member, on the side installed against the floor, of such uninterrupted length as to correspond to the total range through which the base member is movable. In the case of such a continuous opening, folded-back edges are formed in the edges on the side of the opening thereof, and the arm pieces of the base member are caused to engage the said folded-back edges.

BRIEF DESCRIPTION OF THE DRAWINGS

FIG. 2 is a disassembled diagonal view showing the unit's baseboard and the components built into it.

FIG. 3 is a front elevation illustrating the way that the said baseboard and its internal components are assembled.

FIG. 4 is a front elevation showing the manner in which the said baseboard is installed.

DETAILED DESCRIPTION OF THE PREFERRED EMBODIMENT

Figure 1:
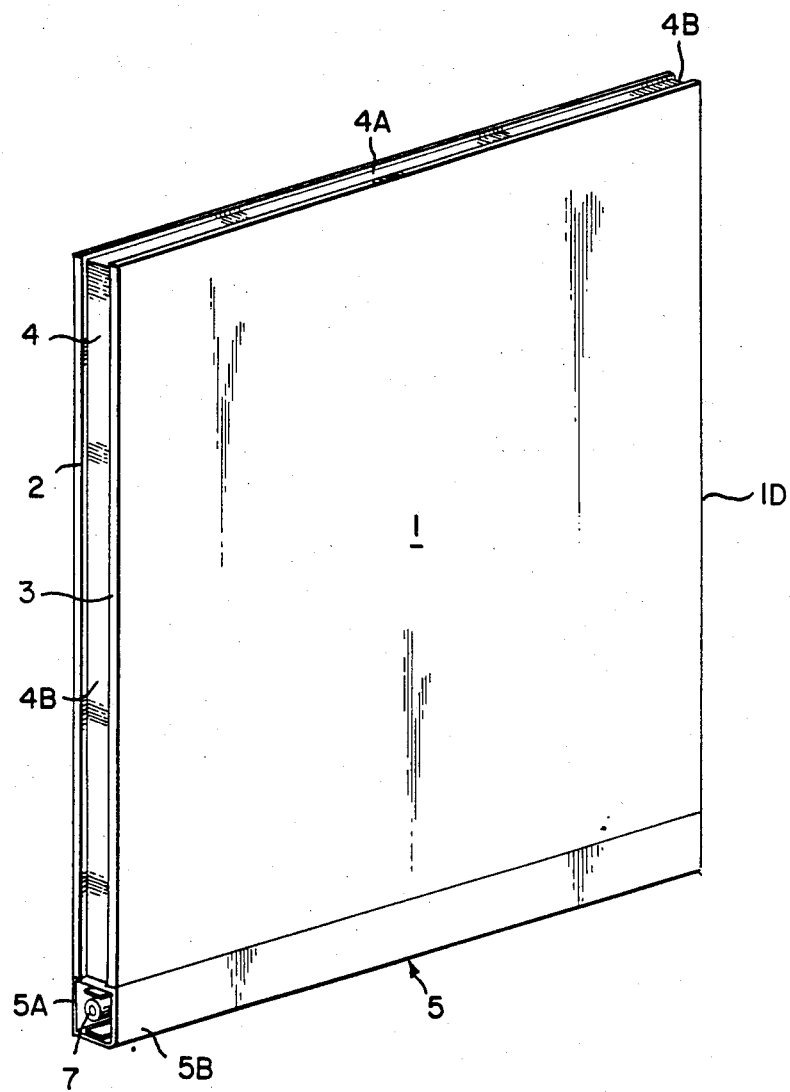
FIG. 1 is a diagonal view showing the partition unit.

The main partition body 1 can be rendered in any desired length or width by making it up of multiple units 1D. Only one unit is shown in the drawings. The aforesaid unit 1D, as shown in FIG. 1 in particular, is made up of a pair of panels 2 and 3, a panel attachment frame 4 which attaches such panels, and a baseboard 5 that is provided at the bottom and constitutes the installation member of the said attachment frame 4.

The panel attachment frame 4 and baseboard 5 may be formed of channel stock, preferably made of a strong metal such as steel.

Accordingly, in the embodiment, the panel attachment frame 4 is arranged with horizontal steel channels 4A, 4A at top and bottom, and with vertical steel channels 4B, 4B in front and back, as a framework, the attachment frame being formed by means of appropriate joining means between the respective adjoining ends.

The baseboard 5, moreover, as shown particularly in FIG. 2, is made up of a gutter-shaped steel baseboard main member 5A and a steel baseboard cover member 5B that can be easily attached to and removed from the open part of the baseboard main member 5A.

While lip-shaped folded-back edges $5A_1$, 5A are formed on both edges on the open side of the baseboard main member 5A so as to face in toward each other, pressed-out protrusions $5B_1$, $5B_1$ are formed extending toward the outside in both foot-shaped parts of the cover member 5B.

As shown in FIG. 3, in the process of attaching the cover member 5B to the open side of the baseboard main member 5A, the pressed-out protrusions $5B_1$, $5B_1$ are pressed and deformed as they slide over the folded-back edges $5A_1$, $5A_1$ upon completion of the attachment, the pressed-out protrusions $5B_1$, $5B_1$, are locked into the folded-back edges $5A_1$, $5A_1$, which have returned to their original pre-deformation shape, so that the cover member 5B is attached to the baseboard main member 5A in such manner that it can be readily removed.

The baseboard 5, configured as noted above, is joined by an appropriate joining means to the horizontal channel steel 4A on the underside of the panel attachment frame 4 so that the cover member 5B is removable, i.e., facing to one side.

As to the joining means between the channel steel 4A and 4B, and between the cover member 5B and the baseboard 5, of the aforesaid panel attachment frame, it is easy to employ such fastening elements and bolts and nuts, but a boltless assembly structure can also be adopted, in which clinching tabs and corresponding arresting holes are used. Either of these methods may be used, or a combination of both.

The panels 2 and 3 which are attached to the panel attachment frame 4 constitute the surfaces, that is to say the cosmetic surfaces, of the partition. These are made into boards by using a cosmetic material with a base material for support, and these are attached to the attachment frame 4 by an appropriate joining means such as noted above.

The unit 1D formed as noted above is made into the prescribed partition by positioning the baseboard 5 on the carpet of the floor, and an appropriate cable 7 is wired into the space inside the baseboard 5. Additionally, inside the baseboard main member 5A, an attachment fitting supports the floor-cable riser and aids in connecting that cable with the cable 7 wired inside the baseboard. Also, opening 10 is formed in the baseboard main member 5A to admit the cable riser.

The invention is provided with a terminal plate 8 for the purpose of supporting the floor-cable riser. If the floor cable is a coaxial cable for use in data transmission, the cable can be bent in any direction, so the terminal plate can be placed in any desired position in the baseboard main member 5A.

If, on the other hand, the floor cable is of a flat shape, it cannot be bent as freely as coaxial cable, so there are limitations on the directions of the risers thereof. In such cases, it is desirable that the attachment fitting have a structure that permits the attachment position of the terminal plate which supports the cable to be changed relative to the baseboard main member.

The example of the embodiment described here corresponds to such a flat cable as noted above, so it has the terminal plate 8 supported by the base member 9.

The base member 9 is made up of a base plate 9A made of flat rigid plate formed of metal of roughly L-shaped attachment pieces 9B, 9B positioned on both sides of the flat part of the said base plate 9A, and of a number of screws 9C, 9C that pass through the center piece $9B_1$ of these attachments pieces 9B, 9B and are screwed into screw holes in the base plate 9A. The terminal plate 8 described above is attached to the flat part between the attachment pieces 9B, 9B of the base plate 9A. Items 11 are fixing screws which pass through the terminal plate 8 and are screwed into the base plate 9A. The arm pieces $9B_3$ and $9B_4$ of the two attachment piece 9B, 9B, having respectively differing lengths, and standing out from the base plate 9A, extend toward the open side of the baseboard main member 5A. The longer arm piece $9B_3$ fits into one of the folded-back edges $5A_1$ at the open side of the baseboard main member, while the other shorter arm piece $9B_4$ fits into the folded-back edge $5A_2$ which is formed in the edge on the side of the opening 10, whereupon the base member 9 is installed in the baseboard main member 5A and engaged therewith such that it can move freely in the longitudinal direction of the said main member 5A.

The screws 9C, after being passed through the holes in the attachment pieces 9B and screwed into the base plate 9A from the open side of the baseboard main member 5A, are screwed down so that their tips press against the bottom surface inside the baseboard main member 5A.

If the screws 9C, after their tips contact the bottom surface inside the baseboard main member 5A, are further screwed in, the base plate 9A will move, being pushed away from the bottom inside surface of the baseboard main member 5A and toward the open side thereof. With that motion, the tips of the arm pieces $9B_3$ and $9B_4$ of the attachment pieces 9B press against the inner surfaces of the folded-back edges $5A_1$ and $5A_2$ of the baseboard main member 5A, whereupon, by means of the screws 9C and the arm pieces $9B_3$ and $9B_4$, the base member 9 is fixed at the prescribed position on the baseboard 5 so that it cannot move.

If the screws 9C are unscrewed so as to loosen them, the base plate 9A, in the reverse of the movement described above, will be moved toward the inner bottom surface of the baseboard main member 5A, and, at the same time, pressure condition of the arm pieces $9B_3$ and $9B_4$ of the attachment pieces 9B against the folded-back edges $5A_1$ and $5A_2$ will be released, in which condition the base member 9 becomes freely movable in the longitudinal direction inside the baseboard main member 5A.

If the width dimensions of the attachment pieces 9B and the folded-back edges $5A_1$ and $5A_2$ are determined such that the arm pieces $9B_3$ and $9B_4$ adequately fit inside the folded-back edges $5A_1$ and $5A_2$, it will not be possible for the base member 9 to fall out of the open side of the baseboard main member 5A when the screws 9C are loosened as described above, so that the base member 9 will thereupon only move in the longitudinal direction of the baseboard main member 5A. In installing the base member 9 into the baseboard main member 5A, it is possible to insert the said base member 9 into one end of the baseboard main member 5A and in toward the middle thereof, but, since the ends of the baseboard are blocked after joints between units have been completed, it is necessary to perform this operation prior to that.

It is desirable that there be no restrictions at installation time, so that installation may be conducted freely. Accordingly, the surface width (short width) of the base plate 9A is made smaller than the width of separation between the tips of the folded-back edges $5A_1$ and $5A_2$ of the baseboard main member 5A, the attachment plate 9B is bent and formed into approximate L-shapes using thin steel sheets that is flexible and deformable, the width between the arm pieces at the center pieces $9B_1$ is made smaller than the width between the folded-back edges $5A_1$ and $5A_2$, as with the aforesaid base plate, and both arm pieces $9B_3$ and $9B_4$ are extended and spread out in a forked shape.

The base plate 9A and attachment plate 9B are assembled beforehand with the screws 9C, and, when pushed down inside the baseboard main member 5A, passing between the folded-back edges $5A_1$ and $5A_2$ thereof, as the base plate 9A passes between the folded-back edges $5A_1$ and $5A_2$, the attachment pieces 9B pass through while their arm pieces $9B_3$ and $9B_4$, inclining outwards on both sides, press against the folded-back edges $5A_1$ and $5A_2$ and are flexibly bent and deformed. After passing through in this manner, the arm pieces $9B_3$ and $9B_4$ expand into the folded-back edges $5A_1$ and $5A_2$ with the recoil force acquired by being flexibly bent and deformed, whereupon engagement with the baseboard main member 5A is achieved and the base member 9 is prevented from falling out.

By forming the opening 10 continuously throughout the movable range of the base member 9 in the baseboard main member 5A, excluding the joints (to the baseboards of adjacent units, etc,) at both ends of the baseboard member 5A, the cable-riser range is also made with, which is most convenient.

The floor cable 6, creep-wired on the surface of the concrete floor 13 underneath the carpet that is laid on the floor, is raised through appropriate slits in the carpet, passed through the opening 10 in the baseboard main member 5A, passed through a clamp 12 attached to the base member 9 that is fixed at the riser position, and positioned on the terminal plate 8, whereupon the prescribed connection is made with the cable 7 wired inside the baseboard 5.

It is preferable that the clamp 12 be made of an insulation material, and fashioned so that it presses the riser 6A of the floor cable against the surface of the base plate 9A and holds it in place. Items 14 are attachment screws which pass through the clamp 12, screw firmly into the base plate 9A, and effect the fixing of the clamp 12 so that it can be readily attached or removed.

The floor cable 6 that is illustrated in this embodiment is a power cable, in which the multiple flat conductors 6B, 6B, and 6G are all insulated with an insulation covering 6Z.

This floor cable 6 for power use has a plastic protective sheet 6P laid underneath it, the width of which sheet 6P is wider than the width of the said floor cable 6. This protective sheet 6P protects against damage arising from small irregularities in the concrete floor surface 13. Also, an electrically conductive metallic sheet 6M is laid above the cable 6 to prevent metal objects from penetrating the carpet and reaching the floor cable 6 and also to protect the cable from heavy weights.

The electrically conductive metallic sheet 6M can also be used as a grounding medium, and it is well that it be electrically connected to the cable's ground conductor 6G at intervals along the length of the cable.

In other words, the cable 6 will contain bends along its route due to connections and directional changes, and the electrically conductive sheet 6M may be interrupted at these points. Hence electrical connections are necessary.

If, as described above, connections are made between the sheet 6M and the cable's ground conductor 6G, then there is connection, between the sheet segments, along the ground conductor 6G.

With such a cable assembly as this, then at least the cable 6 and the electrically conductive sheet 6M are raised.

Thereupon, at the part of the cable riser 6A that extends past clamp 12 through which it is passed, the sheet 6M is cut so that only that portion above the cable's ground conductor 6G extends all the way to the end of the cable, and the appropriate electrically conductive clamps 6C, 6C, 6C are tightened down on each conductor 6B, 6B and 6G.

Meanwhile, the terminal plate 8 of such a cable riser 6A has multiple metal screw-hole-bored fittings 8B, 8B, 8B implanted at prescribed intervals (corresponding to the cable conductors) in its main member surface 8A that is made of insulating material, which are exposed on the front surface. On this surface, separation ridges 8C, 8C, 8C, 8C are provided to the right and left of each metal fitting 8B, 8B, 8B, which ridges effect and maintain the requisite insulation creepage distance.

The preforations or slits provided in the insulating covering between the conductors 6B, 6B, 6G of the cable 6 for convenience in separating the conductors are now cut and the cable riser 6A is positioned on the said terminal plate 8 so that the separation ridges 8C, 8C, 8C, 8C intervene between the separated conductors.

The several separated conductors 6B, 6B, 6G and the extended portion of the metal sheet 6M are between mutually adjacent pairs of separation ridges 8C, 8C, and the clamps 6C that press down thereon are positioned above the screw-hole-bored metal fittings 8B.

Meanwhile, the several insulated wires 7B, 7B, 7G pertaining to the cable 7 wired inside the baseboard 5 and held together by the sheath 7A at its end are separated by stripping the sheath 7A, and the terminals 7C, 7C, 7C are attached to the conductors of the separated wires 7B, 7B, 7G.

These terminals 7C, 7C, 7C are mounted on the clamps 6C, 6C, 6C, and screws 15, 15, 15 are passed through the terminals 7C and the clamps 6C and screwed into the screw-hole-bored metal fittings 8B, 8B, 8B, whereby electrical contact connections are effected between the clamps 6C and the terminals 7C, whereupon the riser of the floor cable 6 is connected.

Since the baseboard 5 is made of metal, it can be used as a grounding medium. In this embodiment, a lead-in wire 17 that is electrically connected to the baseboard main member 5A by means of a grounding machine screw 16 is connected to a connector 18 provided in the ground wire 7G of the cable 7, whereby common grounding through the baseboard 6 is effected not only to the ground wire 7G of the cable 7 wired inside the baseboard, but also to the electrically conducting sheet 6M and the ground conductor 6G of the floor cable that are electrically connected at the terminal plate 8 to the said wire 7G.

Also, since the riser 6A of the floor cable 6 passes through the aforesaid opening 10, after beveling the rough edges thereof it is well to attach a bushing thereto.

With the partition proposed in this invention, connection to the floor-cable riser is effected inside the baseboard, which is directly linked to the installation member, so that the length of the cable riser may be short. For this reason alone the wiring of the cable becomes easy, there is less chance of sustaining damage from without, and no extra components are necessary for the partition.

Moreover, it is easy to make adjustments in the attachment position of the cable-riser terminal plate relative to the cable risers and in conjunction with the cable wiring positions. This invention makes it possible for the first known time to achieve structural simplicity and easy connection to risers of floor cable wired in any many desired, advantages which were not achieved in conventional partitions of this kind.

Various changes to the foregoing described and shown structures would now be evident to those skilled in the art. Accordingly, the particularly disclosed scope of the invention is set forth in the following claims.

We claim:

1. In an electricl partition for connection to flat multi-conductor cable, a baseboard apparatus, comprising:
   an elongate channel having a bottom wall and two sidewalls projecting therefrom, the two sidewalls being spaced from each other and defining an opening therebetween, each sidewall including adjacent its distal end an engagement element;
   a floor-cable riser connector including connecting means for electrically connecting conductors of a flat multiconductor cable to selected conductors of another cable supported in said channel; and
   a support member supporting said floor-cable riser connector in said channel, means cooperatively engaging said support member and said bottom wall of said channel for adjustably moving said support member and thereby said floor-cable riser connector from a first position wherein said support member is freely movable longitudinally within said channel to a second position wherein said support member engages said channel engagement elements for fixed retention within said channel.

2. The invention in accordance with claim 1, wherein said channel has an elongate opening extending through one of its sidewalls for receipt therethrough of a portion of said flat multiconductor cable.

3. The invention in accordance with claim 2, wherein said opening in defined by a cutout of said one sidewall communicating with the distal end of said one sidewall.

4. The invention in accordance with claim 2, wherein said support member includes resilient means adapted to permit resilient entry of said support member through said channel opening to a position interiorly of said channel.

5. The invention in accordance with claim 4, wherein said support member comprises a generally flat plate supporting said floor-cable riser connector and wherein said resilient means comprises at least one pair of spaced, flexible arms projecting outwardly from said plate, each of said flexible arms adapted to engage an engagement element on the respective sidewalls.

6. The invention in accordance with claim 5, wherein each of said arms projects outwardly from said plate at an inclined angle.

7. The invention in accordance with claim 6, wherein one of said flexible arms is longer than the other arm.

8. The invention in accordance with claim 5, wherein there are two pairs of spaced, flexible arms disposed adjacent opposing ends of said plate.

9. The invention in accordance with claim 5, wherein said means for adjustably moving said support member comprise screws adapted to threadably extend through the plate and contact the bottom wall of said channel, whereby upon tightening of said screws said flexible arms engage said sidewall engagement elements in a fixed, resilient manner.

10. The invention in accordance with claim 5, wherein said channel engagement elements are defined by folded-over edges of the respective sidewalls.

11. The invention in acordance with claim 1, further including a cover member having means for resilient attachment to said channel.

* * * * *